(12) United States Patent
Hoynash (10) Patent No.: US 7,207,519 B2
(45) Date of Patent: Apr. 24, 2007

(54) BLADE RESTRAINT SYSTEM

(76) Inventor: Peter Hoynash, 407 Salford Station Rd., Perkiomenville, PA (US) 18074

( * ) Notice: Subject to any disclaimer, the term of this patent is extended or adjusted under 35 U.S.C. 154(b) by 55 days.

(21) Appl. No.: 11/071,504

(22) Filed: Mar. 3, 2005

(65) Prior Publication Data

US 2005/0211825 A1   Sep. 29, 2005

(51) Int. Cl.
*B64C 27/00* (2006.01)
*F16M 13/00* (2006.01)
*E04G 3/00* (2006.01)
*A47F 5/00* (2006.01)

(52) U.S. Cl. .................. 244/17.11; 248/595; 248/598; 248/602; 248/614; 248/276.1; 248/288.11; 248/288.31; 248/292.14

(58) Field of Classification Search ............ 244/17.11, 244/17.23, 17.17, 110 R, 1 R, 17.27; 248/500, 248/503, 229.15, 229.2, 229.25, 227.3, 218.4, 248/219.1, 163.1, 163.2
See application file for complete search history.

(56) References Cited

U.S. PATENT DOCUMENTS

| | | | | |
|---|---|---|---|---|
| 3,133,715 A | * | 5/1964 | Grunfelder | 244/17.11 |
| 3,199,206 A | * | 8/1965 | Snapp | 33/194 |
| 3,408,078 A | * | 10/1968 | Falerni et al. | 473/208 |
| 3,975,580 A | * | 8/1976 | Lewis | 174/45 R |
| 4,301,982 A | * | 11/1981 | Tiemann | 244/17.11 |
| 4,613,096 A | * | 9/1986 | Pugh | 244/1 R |
| 4,623,300 A | * | 11/1986 | Ruzicka | 416/143 |
| 5,211,538 A | * | 5/1993 | Seghal et al. | 416/1 |
| 5,601,274 A | * | 2/1997 | Minor et al. | 248/594 |
| 6,145,785 A | * | 11/2000 | Certain | 244/17.27 |
| 6,237,888 B1 | * | 5/2001 | Coll | 248/539 |
| 6,695,253 B1 | * | 2/2004 | Romani et al. | 244/6 |
| 6,769,644 B2 | * | 8/2004 | Muylaert et al. | 244/17.11 |

OTHER PUBLICATIONS

Seven Sheets of Prior Art: Blade Restraint Drawings, admitted prior art.

* cited by examiner

*Primary Examiner*—Teri Pham Luu
*Assistant Examiner*—Joseph W. Sanderson
(74) *Attorney, Agent, or Firm*—Akin Gump Strauss Hauer & Feld, LLP (57) ABSTRACT

A blade restraint system for restraining a blade of a helicopter comprising a blade clamp releasably mounted to the blade and a pole pair releasably mountable to the blade clamp at a clamp end. The pole pair is releasably mountable to the helicopter fuselage at an aircraft. The pole pair includes a first pole and second pole. The first and second poles are moveable relative to each other between a storage position and an extended position. The first pole is positioned generally within the second pole in the storage position.

9 Claims, 8 Drawing Sheets

BLADE RESTRAINT SYSTEM

BACKGROUND OF THE INVENTION

Helicopters are often stored with their blades in a stowed position to reduce the overall storage space needed for the helicopter or other aircraft and to protect the blades from impact damage caused by equipment or personnel working on the helicopter. The stowed position also protects the blades from potential damage during extreme weather conditions by moving the blades closer to the helicopter or aircraft body to reduce exposure of the blades to severe winds and/or debris. Blades of helicopters are often stowed by pivoting each of the blades at their root such that the blades are each positioned over the aft fuselage of the helicopter and are mechanically held relative to the fuselage. Stowing the blades of a helicopter is convenient for shipboard helicopters when stored in the busy and confined spaces of an aircraft carrier or during rough sea conditions. In addition, in the stowed condition, the helicopter does not take up as much storage space as a helicopter with fully extended blades and the blades are protected from equipment that may be moving about storage areas that could strike and damage the extended blades.

Figure 1:
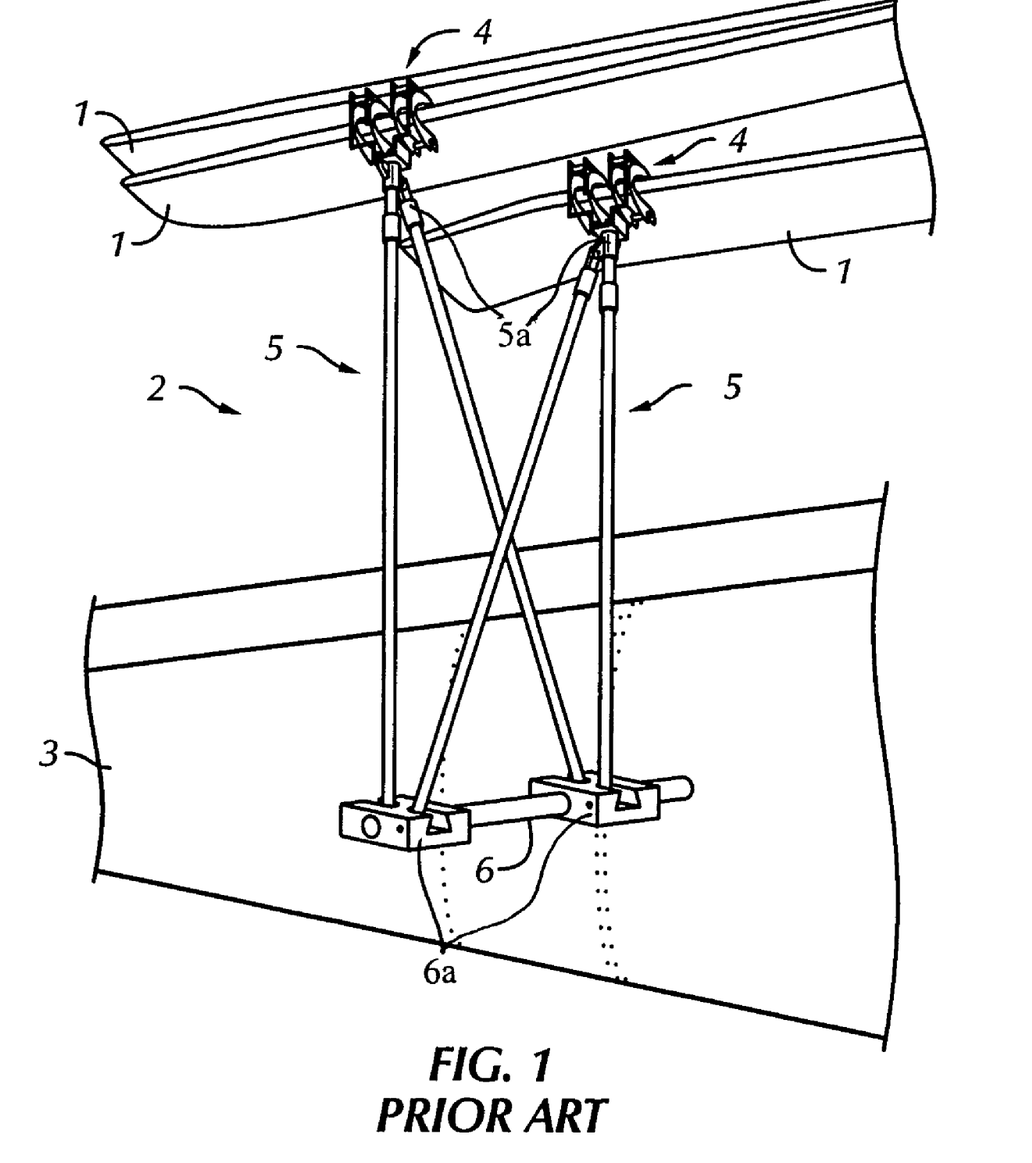
FIG. 1 is a magnified rear perspective view of a fuselage support and poles of a prior art blade restraint system securing blades in a stowed condition.

Referring to Fig. 1 a helicopter aft fuselage 3 having helicopter blades 1 rotated into the stowed condition and a prior art blade restraint system 2 that secures the stowed blades 1 to the helicopter fuselage 3 are shown. As was described above, the blades 1 are pivoted about their roots such that the blades 1 are positioned over the aft fuselage 3 in the stowed condition. The prior art blade restraint system 2 includes a relatively heavy and cumbersome steel and aluminum clamp associated with each blade 1, a pair of relatively heavy cylindrical metal support poles 5 associated with each clamp 4 and a relatively heavy steel fuselage support 6 that extends from a side of the fuselage 3 in a predetermined orientation. The prior art blade restraint system 2 includes over one hundred twenty-four (124) metallic parts in each clamp 4 alone and the metallic construction of the clamp 4, support poles 5 and fuselage support 6 is susceptible to corrosion of many types including galvanic and stress corrosion. The relatively complicated prior art blade restraint system 2 holds the blades 1 in the stowed condition by fixing the fuselage supports 6 in the predetermined orientation relative to the helicopter fuselage 3, mounting the poles 5 to the clamps 4, mounting the clamps 4 to the blades 1 and mounting the poles 5 to the fuselage support 6 in a predetermined order and orientation.

The prior art clamps 4, supports 6 and poles 5 are constructed of relatively heavy steel, aluminum or other metallic materials. The poles 5 each have a generally cylindrical cross-section and are removably mountable to both the fuselage supports 6 and the clamps 4. The fuselage supports 6 include metal dovetail fittings 6a into which a bottom of the poles 5 are removably insertable in a predetermined single orientation such that the predetermined poles 5 are associated with a predetermined blade 1 in a predetermined orientation and position. The poles 5 are pivotally mounted to each other at their top by a pole fitting 5a such that the poles 5 are pivotable between a deployed and a storage position. In the storage position, the cylindrical poles 5 are positioned adjacent to each other such that their longitudinal axes are generally parallel.

The clamps 4, poles 5 and support 6 are relatively large due to the distance between the fuselage support 6 and the blades 1 in the stowed condition and the typical loads that are supported by the clamps 4, poles 5 and support 6. Accordingly, the clamps 4, poles 5 and supports 6 are heavy and cumbersome for ground support personnel. Further, the multitude of parts that make up the prior art blade restraint system 2 increase the likelihood that individual parts may become lost, negatively impacting the use of the device. Lost parts in an aircraft environment is also disfavored because even small lost parts can severely damage the aircraft and, specifically, moving parts of the aircraft when blown about an area where the aircraft or helicopter are taking off. In addition, damage to the metallic parts of the prior art blade restraint system 2 is difficult to repair in a field environment and, specifically, if the poles 5 are bent or crushed, they are unable to be repaired in the field. The poles 5 are specifically subject to crushing damage because the poles 5 are separated during storage because of their cylindrical shape and their weight, which makes the poles 5 difficult to maneuver in a helicopter environment.

In operation, a ground support personnel member carries the cylindrical metal poles 5, steel and aluminum clamps 4 and fuselage support 6 to the fuselage 3. The fuselage support 6 is secured in a predetermined position and orientation to the aft fuselage 3 and the blades 1 are pivoted about their roots such that they are positioned over the aft fuselage 3. The ground support personnel member engages each of the heavy and cumbersome clamps 4 with a specific set of metal poles 5. A first clamp 4 and pair of poles 5 is lifted toward a predetermined blade 1 and the clamp 4 is positioned onto the blade 1 for mounting. The clamp 4 is then engaged with the predetermined blade 1 and the clamp 4, poles 5 and blade 1 are lifted such that a lower end of the poles 5 may be engaged with the fuselage support 6 at a predetermined location. The poles 5 are secured to the fuselage support 6 in the orientation shown in FIG. 1.

Due to the weight and size of the poles 5 and clamp 4, maneuvering the poles 5 and clamp 4 into and out of engagement with one of the blades 1 is difficult and cumbersome. In addition, lifting the weight of the poles 5, clamp 4 and part of the blade 1 to engage the poles 5 with the fuselage support 6 is difficult. The heavy and cumbersome prior art blade restraint system 2 is often dropped or mishandled by the ground support personnel and dropping the heavy clamp 4 with its sharp and exposed edges onto the ground around the helicopter or onto the helicopter itself tends to cause damage to the poles 5, clamp 4 and/or the helicopter itself. In addition, a predetermined set of poles 5 is associated with one blade 1 of the helicopter, which generally includes four blades 1, and each set of poles 5 must be positioned at a specific orientation on one of generally two fuselage supports 6. Accordingly, the prior art blade restraint system 2 must be engaged and disengaged with the helicopter in a specific order and must be correctly oriented or the system will not properly engage the blades 1.

To prepare the helicopter for flight, the poles 5 are disengaged from the helicopter such that the clamps 4 and poles 5 are suspended from the blades 1. The clamps 4 are released from the blades 1 and the clamps 4 and poles 5 are lowered onto the ground, which is a step that often results in mishandling of the clamp 4 and poles 5 combination and damage to the clamp 4, poles 5 or helicopter. Because of their size and weight, the poles 5 and/or clamps 4 are difficult for ground support personnel to maneuver and are often dropped onto the ground or into the helicopter fuselage 3 or blades 1, thereby damaging the blade restraint system 2, fuselage 3 and/or blades 1. The clamps 4 are disengaged from the poles 5 and the heavy poles 5, support 6 and the clamps 4 are removed by the ground support personnel member from the helicopter and placed into storage. In addition, due to the cylindrical shape of the poles 5, the poles 5 rest next to each other in a storage position and are relatively easy to damage by crushing if mishandled.

BRIEF SUMMARY OF THE INVENTION SECTION

Briefly stated, a preferred embodiment of the present invention is directed to a blade restraint system for restraining a blade of a helicopter. The blade restraint system includes a blade clamp releasably mountable to the blade and a pole pair releasably mountable to the blade clamp at a clamp end. The pole pair releasably mounts to the helicopter fuselage at an aircraft end. The pole pair includes a first pole and a second pole. The first and second poles are moveable relative to each other between a storage position and an extended position. The first pole is positioned generally within the second pole in the storage position.

In another aspect, the present invention is directed to a blade restraint system for restraining a blade of an aircraft. The blade restraint system includes a one-piece composite frame that is corrosion restraint. Clamp rubbers are secured to at least one portion of the composite frame to protect the blade and the blade restraint system. A vibration dampener is mounted to the blade restraint system to protect the aircraft, the blade and the blade restraint system for damage during loading. Two poles are removably mountable to the composite frame and are mounted to other. One of the poles is foldable into the other pole in a storage position. A fuselage support is bi-directional installable to the aircraft fuselage. The two poles are removably mounted to the fuselage support. Bumpers are mounted to the blade restraint system to provide drop protection. Polymer springs are mounted to the blade restraint system and are corrosion resistant. Locks are associated with the blade restraint system. Locks are integral with the blade restraint system is constructed of marine grade materials.

BRIEF DESCRIPTION OF THE SEVERAL VIEWS OF THE DRAWINGS

The following detailed description of the preferred embodiments of the present invention will be better understood when read in conjunction with the appended drawings. For the purpose of illustrating the invention, there is shown in the drawings embodiments which are presently preferred. It is understood, however, that the invention is not limited to the precise arrangements and instrumentalities shown. In the drawings.

DETAILED DESCRIPTION OF THE INVENTION

Certain terminology is used in the following description for convenience only and is not limiting. The words, "right," "left," "lower" and "upper" designate directions in the drawings to which reference is made. The words "inwardly" and "outwardly" refer to directions toward and away from, respectively, the geometric center of the blade restraint system and designated parts thereof. The terminology includes the words above specifically mentioned, derivatives thereof and words of similar import. Additionally, the word "a," as used in the specification means at least one.

Referring to FIGS. 2–4B, a blade restraint system 10 in accordance with a first preferred embodiment of the present invention includes at least first and second pole pairs 11, 12, a blade clamp 15 and a fuselage support 36. Each of the pole pairs 11, 12 is associated with a single clamp 15 that is attached to an aircraft blade 16 to secure the blade 16 to an aircraft fuselage 17 in a stowed condition. The pole pairs 11, 12 are comprised of a cylindrical member 11*a*, 12*a* and a channel member 11*b*, 12*b*. The pole pairs 11, 12 are preferably mounted to the fuselage 17 by the fuselage support 36. A helicopter typically includes three, four or more blades 16 and each of the blades 16 is preferably associated with a pole pair 11, 12 and a clamp 15. In addition, each pair of pole pairs 11, 12 is typically associated with a fuselage support 36 for mounting the pole pairs 11, 12 to the aircraft fuselage 17. The preferred blade restraint system 10 includes enough pole pairs 11, 12, clamps 15 and fuselage supports 36 to accommodate each blade 16 of the specific helicopter or other aircraft.

Figure 2:
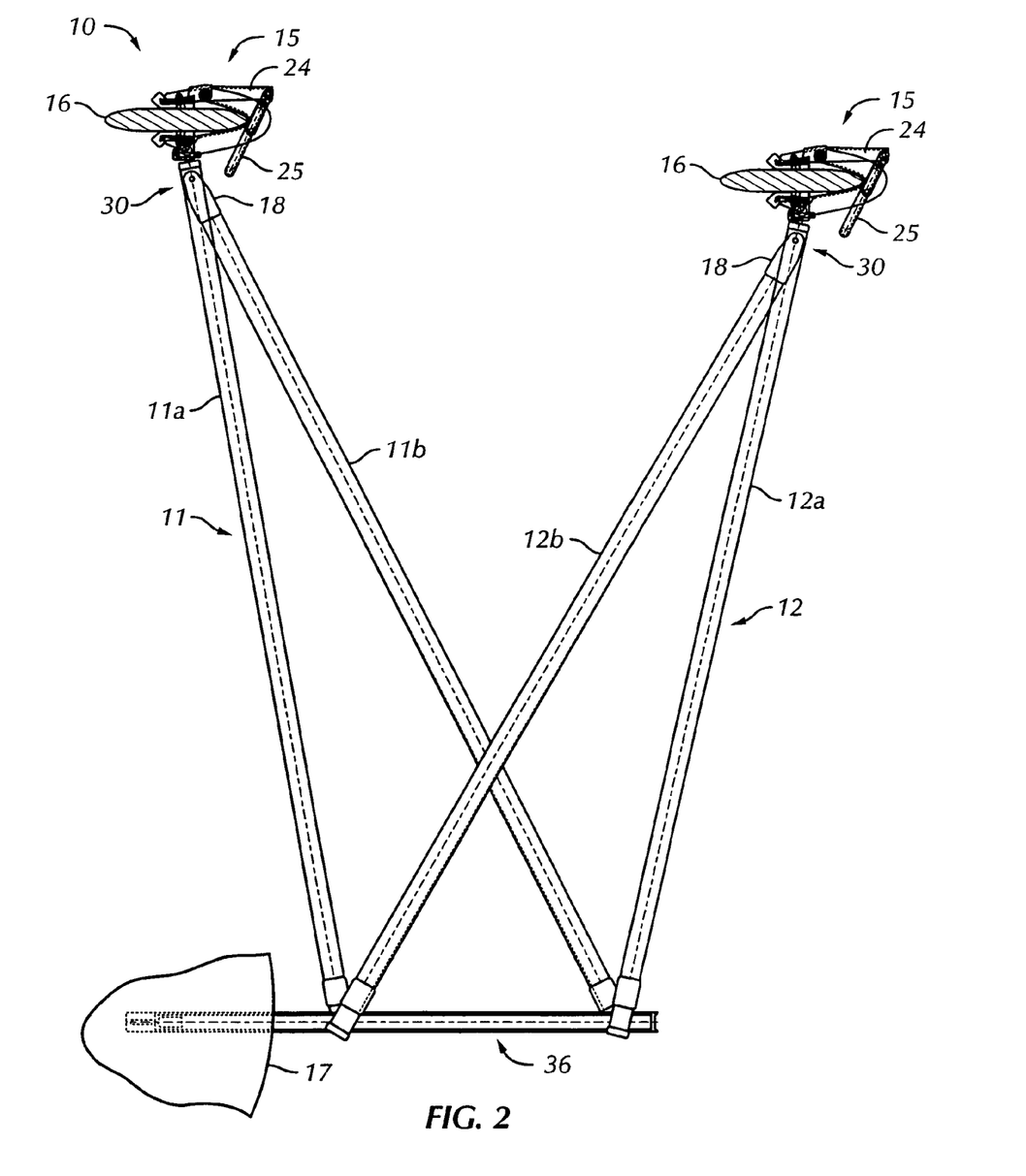
FIG. 2 is a rear elevational view of a pair of blade restraint systems in accordance with a first preferred embodiment of the present invention.
Figure 4A:
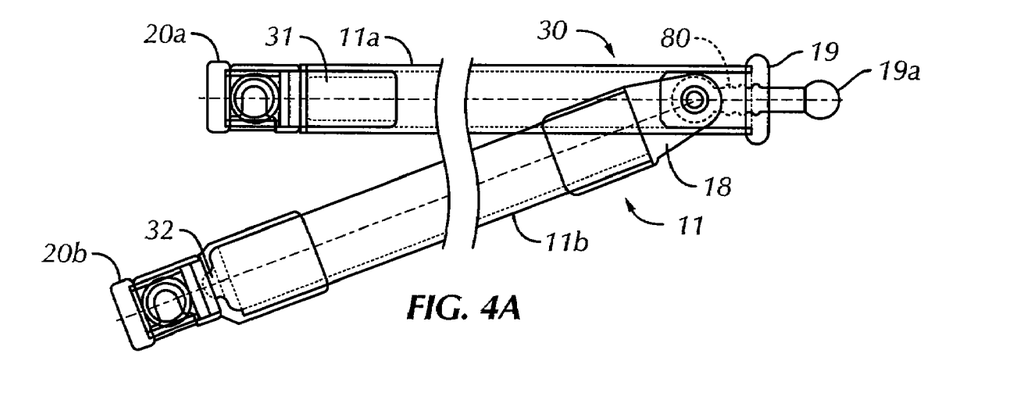
FIG. 4A is a rear elevational view of the poles of the blade restraint system of FIG. 2 in an extended position.
Figure 4B:
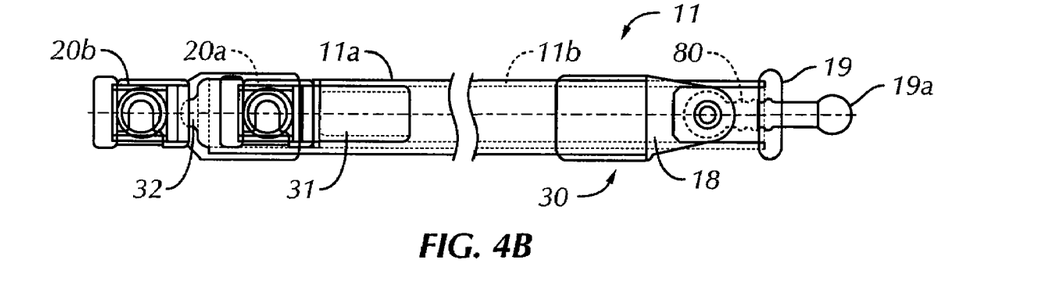
FIG. 4B is a rear elevational view of the poles of FIG. 4A shown in a storage position.

Referring to FIGS. 2, 4A and 4B, for convenience, the first pole pair 11 will be described in detail, it being understood that the second and any additional pole pairs 12 have the same or a similar construction when compared to the first pole pair 11. The most significant difference between each of the pole pairs 11, 12 is the length of the individual cylindrical members 11*a*, 12*a* and channel members 11*b*, 12*b*. The cylindrical members 11*a*, 12*a* and channel members 11*b*, 12*b* have different lengths to accommodate attachment to different blades 16 of the helicopter at different heights. In the preferred embodiments, the cylindrical member 11*a* is constructed of a filament wound carbon fiber composite material having a cylindrical cross-section and the channel member 11*b* is preferably constructed of an E-glass filament wound channel having a U-shaped cross-section. One having ordinary skill in the art will realize that the cylindrical member 11a is not limited to filament wound carbon fiber constructions and the channel member 11b is not limited to filament wound E-glass channel constructions. The cylindrical member 11a and channel member 11b are preferably constructed of a light weight material that is able to withstand the structural loads typically developed in the blade restraint system 10 and take on the general shapes of the cylindrical and channel members 11a, 11b, respectively. For example, the cylindrical and channel members 11a, 11b may be constructed of a pultruded Kevlar material, titanium or a machined aluminum.

The cylindrical member 11a and channel member 11b are secured to each other at a clamp end 30 by a first ball fitting 19. The first ball fitting 19 is fixed to the cylindrical member 11a at the clamp end 30 and a channel coupling 18 is fixed to the clamp end 30 of the channel member 11b. The channel coupling 18 is pivotally mounted to the first ball fitting 19 such that the cylindrical and channel members 11a, 11b are pivotable relative to each other. The first ball fitting 19 and channel coupling 18 permit the cylindrical member 11a and channel member 11b to pivot at the clamp end 30 and secure the cylindrical and channel members 11a, 11b together. The first ball fitting 19 includes a first ball joint 19a at its terminal end extending away from the cylindrical member 11a. A second ball joint 20a is secured to an aircraft end 31 of the cylindrical member 11a opposite the first ball fitting 19 and a third ball joint 20b is fixed to an aircraft end 32 of the channel member 11b opposite the channel coupling 18. The first ball fitting 19 and first ball 19a are utilized to removably secure the first pole pair 11 to the clamp 15, as will described in greater detail below.

The channel coupling 18 and first ball fitting 19 are not limited to the specific configuration shown in FIGS. 4A and 4B but are designed to pivotally secure the cylindrical member 11a to the channel member 11b and pivotally secure the clamp end 30 of the first pole pair 11 to the clamp 15. The channel coupling 18 and first ball fitting 19 could take on nearly any configuration that pivotally secures the cylindrical member 11a to the channel member 11b and secures the first pole pair 11 to the clamp 15. For example, the cylindrical member 11a, channel member 11b and clamp 15 could each be secured together by a single pin that permits pivoting of the cylindrical member 11a relative to the channel member 11b and permits pivoting of the clamp 15 relative to the first pole pair 11.

The first ball fitting 19 preferably secures the cylindrical member 11a to the channel member 11b such that the cylindrical member 11a is receivable within the channel member 11b in a nested or storage position (FIG. 4B). The first pole pair 11 is also preferably pivotable to a deployed or extended position to (FIGS. 2 and 4A). The first pole pair 11 is simple to deploy, has a strong crush resistance in its storage position, requires minimal space for storage and generally prevents the cylindrical and channel members 11a, 11b from being separated. The storage position is preferred for crowded and hectic maintenance areas where helicopters are typically located when they are not in operation. In addition, because of its composite construction, even if the first pole pair 11 is damaged, crushed or bent during storage or operation, the fist pole pair 11 is generally repairable using a composite field repair kit.

Referring to FIGS. 3A–3C and 7A–9, the clamp 15 of the first preferred embodiment includes a pair of C-shaped frames 21 including an upper leg 21b and a lower leg 21a, a frame plate 60 that extends between and connects the frames 21 at the lower legs 21a, a clamping portion or actuating arm 24 with a pair of feet 22 on its clench end, a pair of clench pads 23 mounted to the frame plate 60 and feet 22, respectively and a handle 25. The clench pads 23 include a first grasping surface $23s_1$ and a second grasping surface $23s_2$ that are facing each other in an assembled or working position. The lower leg 21a is preferably longer and extends beyond a terminal end of the upper leg 21b. The C-shaped frames 21 are integral with the frame plate 60 in the preferred embodiment forming a simple, one-piece main frame. The actuating arm 24 is pivotally mounted between the C-shaped 21, preferably at the terminal end of the upper legs 21b such that the feet 22 are positioned over the frame plate 60. The handle 25 is pivotally mounted to the C-shaped frames 21 and an end of the actuating arm 24 opposite the feet 22. The clench pads 23 extend at least partially beyond the edges and in some instances over the edges of the feet 22 and frame plate 60 such that any sharp edges of the feet 22 and frame plate 60 are covered by the clench pads 23. A first ball joint 26 is secured between the frames 21 adjacent the lower clench pad 23.

Figure 3A:
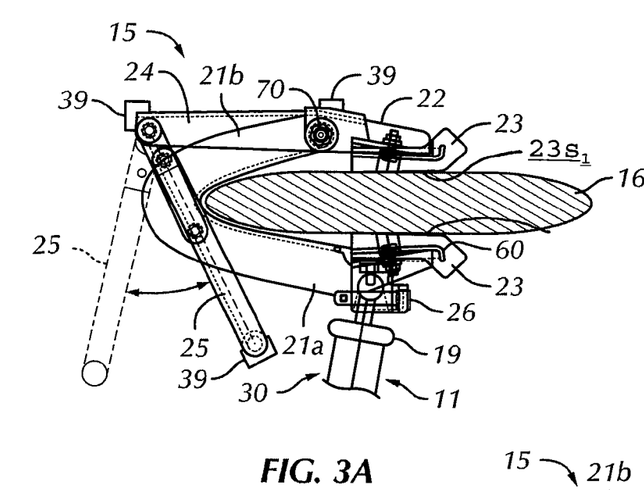
FIG. 3A is a magnified rear elevational view of a clamp and poles of the blade restraint system of FIG. 1.
Figure 3B:
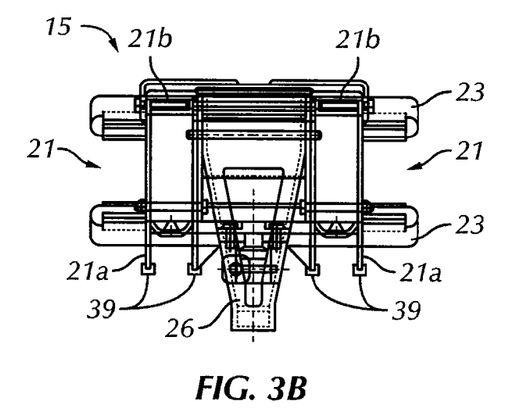
FIG. 3B is a left-side elevational view of the clamp of FIG. 3A.
Figure 3C:
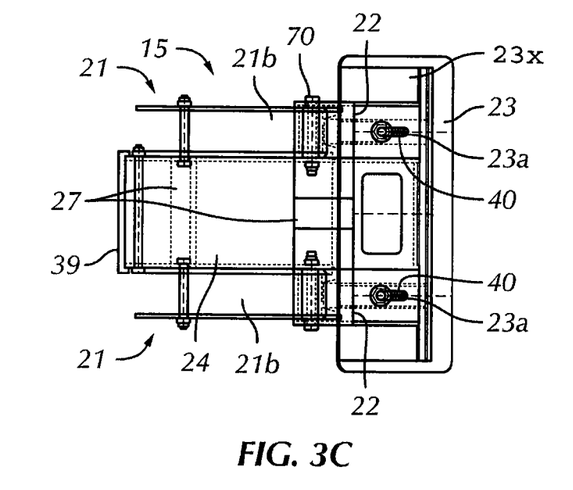
FIG. 3C is a top plan view of the clamp of FIG. 3A.

The C-shaped frames 21, frame plate 60, actuating arm 24 and handle 25 are each preferably constructed of a composite material and, in the first preferred embodiment, are constructed of a carbon fiber composite material. The carbon fiber composite material has a high strength to weight ratio when compared to most metals. Accordingly, the clamp 15 with its composite frames 21, frame plate 60, actuating arm 24 and handle 25 is typically lighter than the prior art metal and steel clamp 4. In the first preferred embodiment, the clamp 15 is approximately one-half the weight of the prior art clamp 4. The frames 21, frame plate 60, actuating arm 24 and handle 25 are not limited to composite constructions and may be constructed of nearly any material that has a relatively high strength to weight ratio, is able to take on the general shape of these components and is able to withstand the normal operating conditions of the clamp 15.

The frames 21 include the upper leg 21b and the comparatively longer lower leg 21a in the first preferred embodiment. The upper leg 21b is comparatively shorter than the lower leg 21a to accommodate the actuating arm 24 with its pivotable feet 22, which are attached to terminal ends of the upper legs 21b. The upper leg 21b is preferably shorter than the lower leg 21a so that the clench pad 23, secured to the frame plate 60 at the ends of the lower leg 21a, is vertically aligned with the clench pad 23 secured to the feet 22 on the actuating arm 24. The clench pads 23 are aligned to apply a generally even pressure on the blade 16 during clamping in a working position. The upper leg 21b is not limited to being shorter than the lower leg 21a and may be longer or the same length as the lower leg 21a as long as the blade 16 may be grasped between the upper and lower legs 21a, 21b with the clench pads 23. For example, the lower and upper legs 21a, 21b may be the same size and flexible enough to receive the blade 16 between ends of the legs 21a, 21b to hold the blade 16 with the clamp 15 in the working position.

Figure 8:
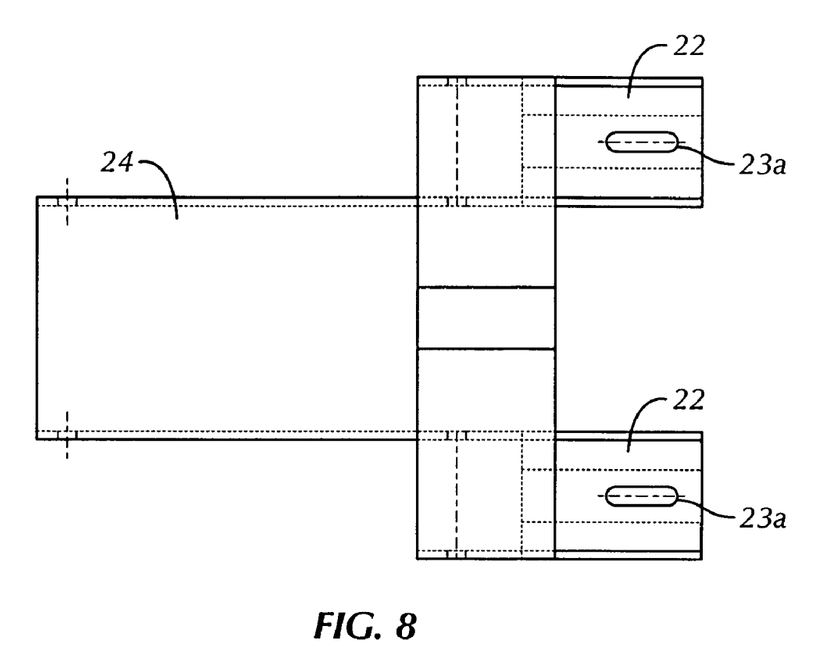
FIG. 8 is a top plan view of an actuating arm of the clamp of the blade restraint system of FIG. 2.
Figure 9:
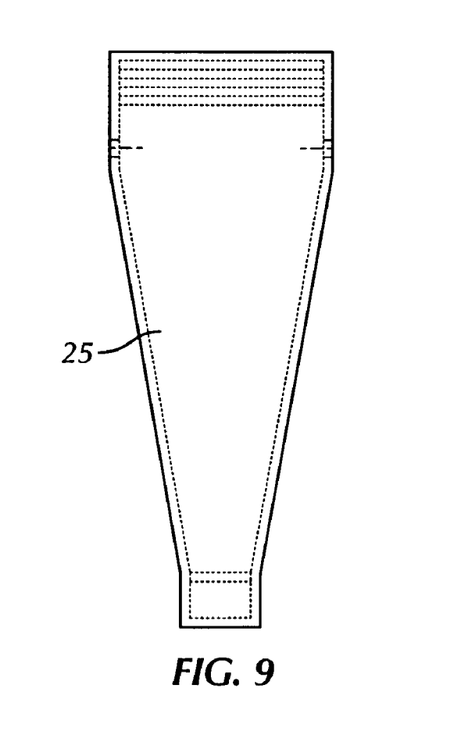
FIG. 9 is rear elevational view of a handle of the blade restraint system of FIG. 2.

In the first preferred embodiment, the actuating arm 24 is pivotally secured to the end of the upper legs 21b such that the feet 22 are pivotable toward or away from the frame plate 60. The actuating arm 24 is in turn pivotally secured to the handle 25 which may be grasped by a user or ground support personnel to pivot the actuating arm 24 and feet 22 toward or away from the lower leg 21a and frame plate 60. The actuating arm 24 and handle 25 are preferably pivotally secured to each other so that a force applied to the handle 25 causes the handle 25 to pivot relative to the actuating arm 24 and frames 21 and the feet 22 to pivot toward or away from the lower leg 21a and from plate 60. The handle 25 and actuating arm 24 are both preferably constructed of a composite material to reduce the overall weight and increase the corrosion resistance of the blade restraint system 10. The materials of both the actuating arm 24 and handle 25 are not limited to composite constructions and may be constructed of nearly any material that is able to take on the general shape and perform the functions of the frames 21 and feet 22, as is described above.

The clench pads 23 are secured adjacent ends of the feet 22 by an upper support plate 23x and adjacent ends of the lower leg 21a to the frame plate 60. The clench pads 23 are preferably constructed of a flexible material that does not damage the composite blades 16 when the blades 16 are clamped therebetween. In the preferred embodiment, the clench pads 23 are constructed of a polymeric material that has a relatively high elasticity, for example, a rubber material. The high elasticity distributes a clamping force along a surface of the blade 16 when the blade 16 is clamped between the clench pads 23. The clench pads 23 also extend beyond the edges of the upper support plate 23x and the frame plate 60 to minimize damage to structure that the clamp 15 may be dropped onto or bumped into. In addition, in the preferred embodiment, a bumper 39 is secured to the actuating arm 24, handle 25 and/or C-shaped frames 21 to protect the clamp 15 or structure that the clamp 15 comes into contact with from damage if the clamp 15 is dropped or bumps into the aircraft or other structures.

The clench pads 23 are designed to move relative to the legs 21b, 21a such that the blade restraint system 10 tightly grasps the blades 16 in the working position. In the preferred embodiments, the clench pads grasp the blades 16 with more force if the blades 16 move relative to the feet 22, based on a wedge principle. The clench pads 23 preferably move relative to the legs 21b, 21a to tighten their grip on the blades 16 if one of the blades 16 or first pole pair 11 is subjected to a wind load, wave load, stepped upon, impacted or otherwise moves when stowed. Specifically, in an initial grasping position, the clench pads 23 are biased toward an inner end of pad slots 23a that are positioned in the feet 22 and frame plate 60. If the blade 16 or first pole pair 11 is subjected to a sudden or shock load, the clench pads 23 may move against the bias along the slots 23a and away from the frame 21. The clenching force of the clench pads 23 increases based on the wedge principle as the clench pads 23 move along the slots 23a. The clench pads 23 are preferably biased toward the initial clenching position by a polymer spring 40. The polymer spring 40 is preferably highly corrosion resistant. In the preferred embodiments, the blade restraint system 10 includes polymer springs 40 throughout due to their corrosion resistance.

A first ball joint 26 is preferably fixed to the frame plate 60 between the C-shaped frames 21 and accepts the first ball 19a therein to secure the first pole pair 11 to the clamp 15. The first ball joint 26 and first ball 19a permit the clamp 15 to pivot relative to the first pole pair 11 and are constructed in a manner that is well known to one having ordinary skill in the ball joint art. However, the first ball joint 26 includes a polymer spring (not shown) that permits snap locking of the clamp 15 to the first pole pair 11. The polymer spring is preferably highly resistant to corrosion. The clamp 15 and first pole pair 11 are not limited to attachments including the first ball joint 26 and first ball 19a and may be secured relative to each other in a number of manners, including a single pin that permits pivoting between the first pole pair 11 and clamp 15, adhesive bonding or alternative fastening methods that would be obvious to one having ordinary skill in the art. However, the first ball joint 26 and first ball 19a are preferred because they allow two-dimensional pivoting of the first pole pair 11 relative to the clamp 15.

Construction of the clamp 15, fuselage support 36 and pole pairs 11, 12 using composite materials is preferred for the blade restraint system 10, at least because the composite materials are generally more forgiving when they come into contact with the composite aircraft blades 16 or fuselage 17. For example, direct contact between certain types of metals and composite materials has a tendency to degrade the mechanical properties of the composite materials. Degradation of these mechanical properties is undesirable for structural composite components, for example, the aircraft blades 16, aircraft fuselage 17 and pole pairs 11, 12. In addition, the composite materials of the blade restraint system 10 are generally more forgiving if they impact the composite blades 16, due at least partially to their reduced weight. Specifically, impact damage to composite aircraft blades 16 is difficult to detect and often does not appear on the surface of a composite blade 16. Impact damage is not obvious on the surface because delaminations within the composite blade 16 may result from external impacts, which negatively influence the mechanical properties of the blade 16. Further, any damage to the blades 16 creates safety of flight issues for the helicopter operator, the pilot and passengers. The reduced weight of the blade restraint system 10 and its individual components reduces the likelihood that a ground support personnel may drop a heavy metal blade restraint system onto the composite blade 16, causing impact damage and, potentially, delaminations within the blade 16.

The composite materials of the blade restraint system 10 are also generally highly resistant to corrosion. Corrosion resistance is particularly desirable in salt water applications because salt water is generally highly corrosive to metals. The composite materials utilized for the blade restraint system 10 have a comparatively high corrosion resistance to salt water with respect to typical metals and have a high corrosion resistance in general. Therefore, the blade restraint system 10 having numerous composite material components may be preferable for helicopters that often come into contact with salt water, for example, Naval helicopters.

Figure 5:
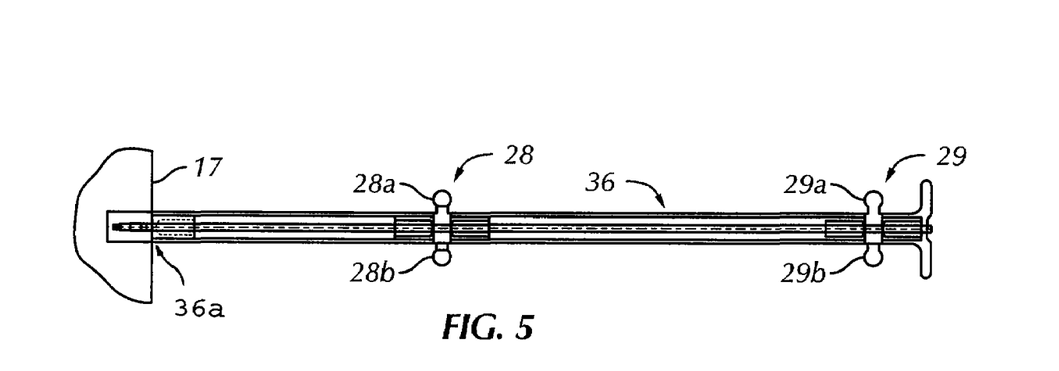
FIG. 5 is a top plan view of a fuselage support of the blade restraint system of FIG. 2.

Referring to FIG. 5, the fuselage support 36 extends from the fuselage 17 of the aircraft and is comprised of a generally cylindrical fiber reinforced composite pole with a second ball fitting 28 fixed proximate its middle and a third ball fitting 29 fixed adjacent an end of the fuselage support 36 opposite a root end 36a, which is removably mountable the fuselage 17. The fiber reinforced composite material has the potential to reduce the weight of the fuselage support 36 when compared to the prior art support 6 by approximately seventy-five percent (75%). The fuselage support 36 is preferably constructed of a composite material similar to the above-described materials of the pole pairs 11, 12 or clamps 15 and has similar advantages, as were described above.

Both the second and third ball fittings 28, 29 include forward and aft balls 28a, 28b 29a, 29b extending therefrom. The forward balls 28a, 29a or aft balls 28b, 29b are removably securable to the second and/or third ball joints 20a, 20b at the ends of the pole pairs 11, 12. The attachment of the pole pairs 11, 12 to the fuselage support 36 is not limited to the ball joints 20a, 20b and second and third ball fittings 28, 29. For example, the pole pairs 11, 12 may be secured to the fuselage support 36 by a pair of pins, nuts and bolts or other fastening devices that would be obvious to one having ordinary skill in the art. The ball joints 20a, 20b and second and third ball fittings 28, 29 are preferred for securing the pole pairs 11, 12 to the fuselage support 36 because these joints provide two degrees of pivotable movement between the pole pairs 11, 12 and the fuselage support 36.

Each of the components of the blade restraint system 10 of the preferred embodiments is constructed of a Marine grade material. Marine grade materials are preferred for ease of maintenance and because they are typically highly corrosion resistant.

Referring to FIGS. 3A–3C, the blade restraint system 10 of the first preferred embodiment includes an adjustment mechanism 70 that is positioned between the actuating arm 24 and the terminal end of the upper leg 21b of the C-shaped channels 21. The adjustment mechanism 70 is utilized to adjust the clamping force of the clamp 15 by moving the feet 22 toward or away from the frame plate 60. The adjustment mechanism 70 permits adjustment of the clamping force of the clamp 15 without disassembly of the clamp 15 or any other portion of the blade restraint system 10. The adjustment mechanism 70 is preferably utilized when the blade restraint system 10 is not installed on the helicopter, however, the adjustment mechanism 70 may be utilized to modify the clamping force of the clamp 15 in the working position.

Referring to FIGS. 4A and 4B, in the preferred embodiments, the pole pairs 11, 12 include a tight tolerance, built-in shock absorbing mechanism 80 that absorbs loads that are introduced into the blade restraint system 10. The loads absorbed by the shock absorbing mechanism 80 may be of any type including shock loading. The preferred shock absorbing mechanism 80 includes a spring-damper device 80 that is positioned between the first ball 19a and the channel member 11b. The spring-damper device 80 absorbs loads that are introduced into the blade restraint system 10 to limit damage that may occur to the blade restraint system 10, blades 16 and/or helicopter fuselage 17 when loads are introduced into the blade restraint system 10. The blade restraint system 10 is not limited to inclusion of the spring-damper device 80 being secured between the first ball 19a and the channel member 11b or to the inclusion of a shock absorbing mechanism 80. The shock absorbing mechanism 80 is included in the preferred pole pairs 11, 12 to limit damage during loading of the system.

Referring to FIGS. 2–5 and 7A–9, the operation of securing the first pole pair 11 of the first preferred embodiment to the fuselage support 36 and the blade 16 and removing the blade restraint system 10 therefrom is described below, it being obvious to one having ordinary skill in the art that any additional pole pairs 12 are secured to and removed from the blade 16 and fuselage support 36 in a similar manner to the first pole pair 11. Referring to FIGS. 2–5, in operation, the fuselage support 36 is attached to a side of the aft fuselage 17 such that the second and third ball fittings 28, 29 are exposed. The fuselage support 36 is designed such that it is operable when it is installed in an upright or upside-down position. It is preferred that the pole pairs 11, 12 are mountable bi-directionally to the fuselage support 36 to simplify installation and reduce installation time. In the preferred embodiments, the blade restraint system 10 includes a forward and an aft fuselage support 36, which are each associated with two pole pairs 11, 12. The fuselage supports 36 are associated with two pole pairs 11, 12 because of the configuration of the helicopter that is associated with the preferred blade restraint system 10.

In the first preferred embodiment, one of the blades 16 of the helicopter is pivoted at its root such that the blade 16 extends generally parallel to and above the aft fuselage 17. The handle 25 of the clamp 15 is actuated by the ground support personnel such that the handle 25, actuating arm 24 and feet 22 are positioned in an open position. The clamp 15 is mounted to the first pole pair 11 by engaging the first ball 19a with the first ball joint 26. The clamp 15 is guided toward the blade 16 using the first pole pair 11 until an edge, preferably the leading edge of the blade 16, is in contact with a root portion of the frames 21 between the upper and lower legs 21b, 21a where the blade 16 is positioned between clench pads 23. The blade 16 is preferably fully engaged by the clamp 15 such that its leading edge is in contact with the root portion of the frames 21, however, such an engagement is not limiting. The handle 25 is actuated in an opposite direction, which urges the actuating arm 24 to pivot the feet 22 toward the lower leg 21a to clamp the blade 16 between the clench pads 23 in a clamping position. The first pole pair 11, clamp 15 and blade 16 are lifted by the ground support personnel member such that the first pole pair 11 may be engaged with the fuselage support 36. Specifically, the second ball joint 20a is engaged with the forward ball 28a of the second ball fitting 28 and the third ball joint 20b is engaged with the forward ball 29a of the third ball fitting 29. The blade 16 is thereby stabilized relative to the aft fuselage 17 of the helicopter by the clamp 15, first pole pair 11 and support 36.

The blade restraint system 10 is removed from the blade 16 by initially removing the first pole pair 11 from the fuselage support 36 and lowering the first pole pair 11, clamp 15 and blade 16 toward the ground. The clamp 15 and first pole pair 11 are hanging from the blade 16 in this lowered position. The second pole pair 12 is then removed from the fuselage support 36 and the fuselage support 36 is removed from the aircraft. The clamp 15 is actuated using the handle 25 to move the actuating arm 24 and pivot the feet 22 away from the lower leg 21a. This releases the clamp pads 23 from the blade 16, thereby permitting the clamp 15 to release and move away from the blade 16. The clamp 15 and attached first pole pair 11 is moved away from the blade 16 and is lowered to the ground. Because of the reduced weight of the first pole pair 11 and clamp 15, the ground support personnel member is less likely to drop or mishandle the first pole pair 11 and clamp 15, thereby reducing the likelihood of damage occurring to the clamp 15, first pole pair 11, blade 16 and/or the helicopter fuselage 17. In addition, the blade restraint system 10 does not include protruding parts or locking pins that extend away from the clamp 15 or first pole pair 11 that may be damaged if and when the blade restraint system 10 is dropped or mishandled. In addition, the elimination of numerous protruding parts and locking pins reduces the potential for loose parts remaining in the area of the helicopter or other aircraft and potential foreign object damage (FOD), as is understood by one having ordinary skill in the art. The clamp 15 is released from the first pole pair 11 and the cylindrical member 11a is positioned within the channel member 11b for storage. The first pole pair 11, clamp 15 and fuselage support 36 are removed from the area of the helicopter for storage or may be stored within the helicopter.

One having ordinary skill in the art will recognize that the blade restraint system 10 is integrally locking such that no separate pins, clamps, fasteners, keys or other like engagement mechanisms are required to engage and/or disengage the blade restraint system 10 of the first preferred embodiment from the blade 16. The integrally locking system is preferred to reduce part count and generally eliminate the possibility that a relatively small and separable pin, fastener, clamp or key is dropped, misplaced or lost during operation. A dropped, misplaced and/or lost pin, fastener, clamp or key may damage a helicopter during operation or maintenance by coming into contact with moving parts, being stepped on or otherwise damaging parts of the helicopter. One having ordinary skill in the art will realize that a misplaced or lost pin, fastener, clamp or key is a foreign object that may cause damage to a helicopter if it is not removed from the helicopter or an area around the helicopter prior to or during operation or maintenance. Such lost or misplaced objects may cause FOD to the helicopter. In addition, one having ordinary skill in the art will realize that the integral locking system of the blade restraint system 10 is relatively easy to deploy and/or operate by a ground support personnel when compared to a metallic, heavy restraint system with separable pins, fasteners, clamps and/or keys.

Referring to FIGS. 6A–6D, a second preferred embodiment of the blade restraint system 10' of the present application is shown. The second preferred embodiment is described using like reference numerals to indicate like elements with a prime symbol (') to indicate the second preferred embodiment and describes the second preferred embodiment with the first pole pair 11'. It being understood that the second preferred embodiment of the blade restraint system 10' may be incorporated with any of the pole pairs 11, 12. The blade restraint system 10, 10' of the first and second preferred embodiments are held from the bottom, which generally makes the device significantly easier to lift and control.

The second preferred embodiment of the blade restraint system 10' is constructed and functions in a similar fashion to the first preferred embodiment and includes a unitary clamp 15' with a single lower leg 21a' and a single upper leg 21b'. The lower and upper legs 21a', 21b' include clamp pads 23' at their respective ends that are used to clamp the helicopter blade 16' therebetween in a working position. The upper leg 21b' includes a notch 45 near its terminal end that creates a living hinge between a base 46 and a pivoting end 47 of the upper leg 21b'. The notch 45 permits the pivoting end 47 to pivot relative to the base 46 so that the clamp pad 23' attached to the pivoting end 47 moves toward and away from the clamp pad 23' attached to the terminal end of the lower leg 21a' when a pole lock mechanism 50 is actuated. The second preferred embodiment is not limited to the inclusion of the notch 45 to create the living hinge and permit pivoting of the pivoting end 47 relative to the base 46. For example, the pivoting end 47 may be hinged to the base 46 by a butterfly hinge or nearly any other mechanism that permits pivoting of the pivoting end 47 relative to the base 46 or permits movement of the pivoting end 47 toward the free end of the lower leg 21a' to clamp the blade 16' therebetween.

Figure 6A:
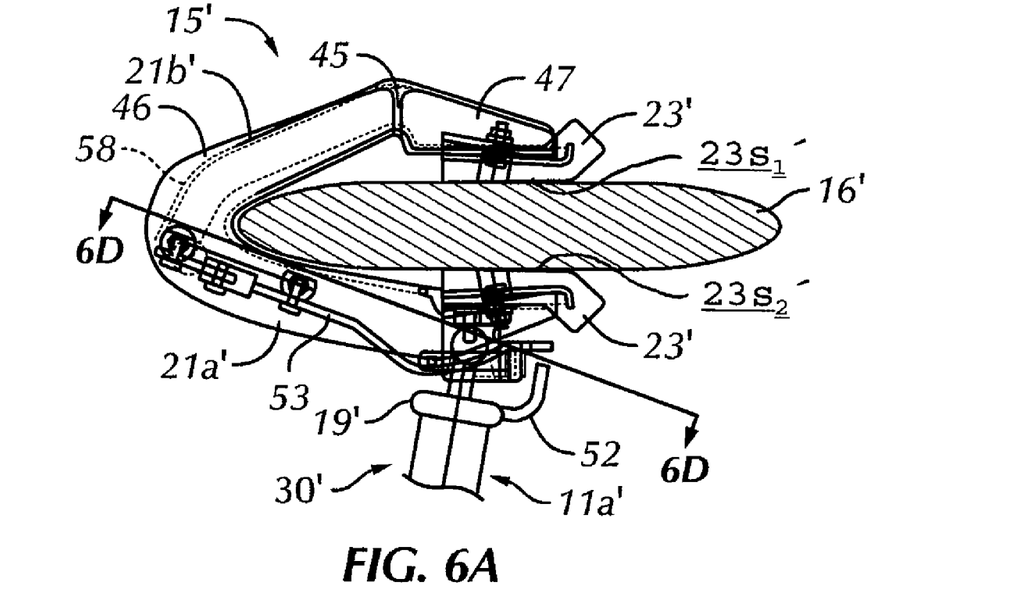
FIG. 6A is a magnified rear elevation view of a second preferred embodiment of a clamp and poles of the blade restraint system of the present invention.
Figure 6B:
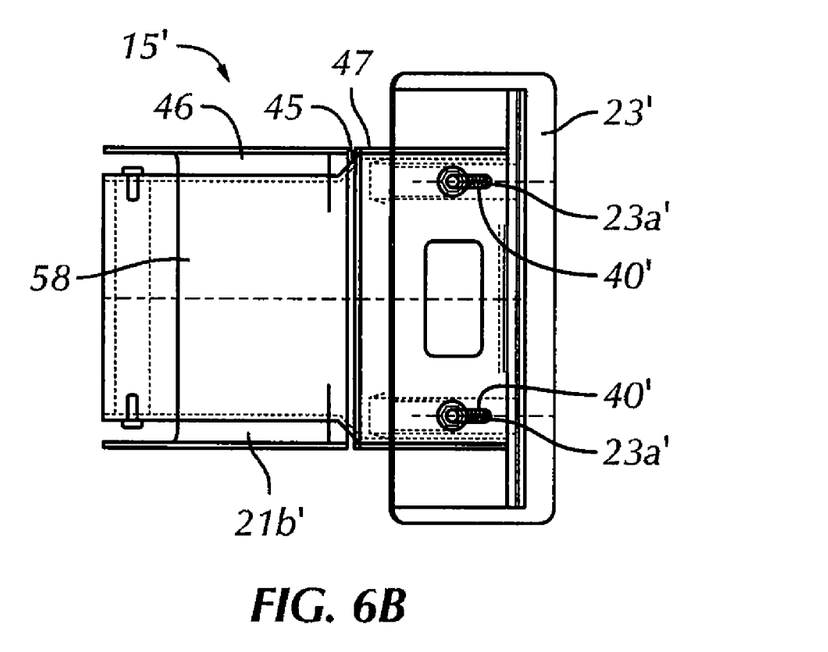
FIG. 6B a top plan view of clamp of the blade restraint system shown in FIG. 6A.
Figure 6C:
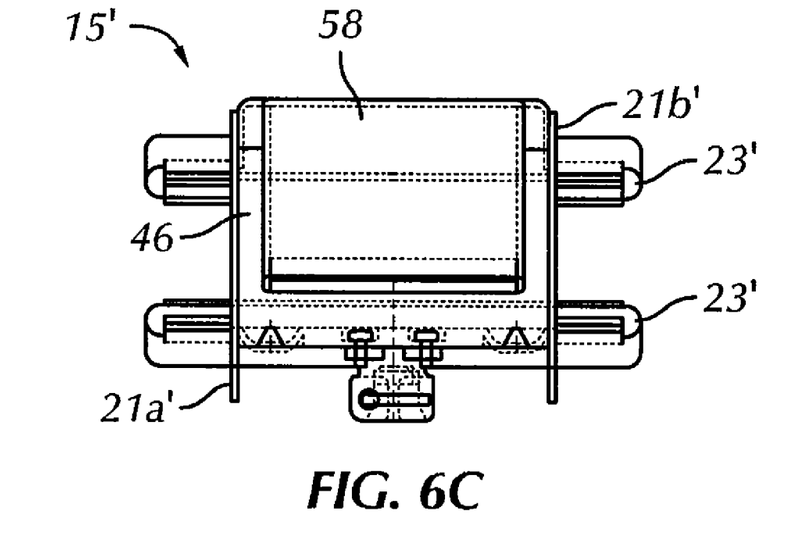
FIG. 6C is a left-side elevation view of the clamp of the blade restraint system shown in FIG. 6A.
Figure 6D:
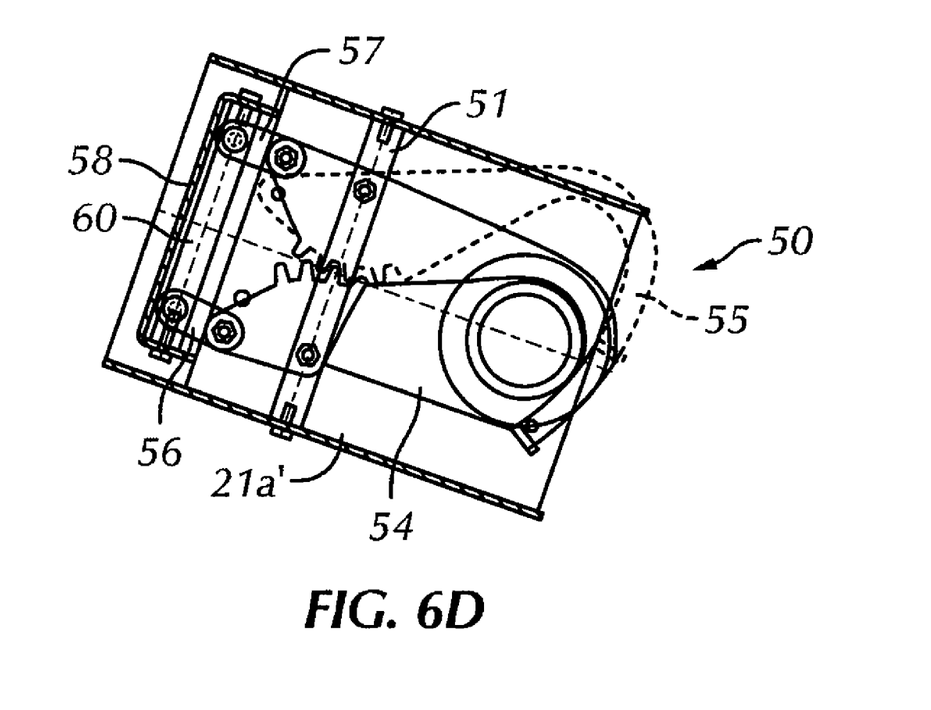
FIG. 6D is a cross sectional view of the blade restraint system shown in FIG. 6A, taken along line 6D—6D of FIG. 6A.
Figure 7A:
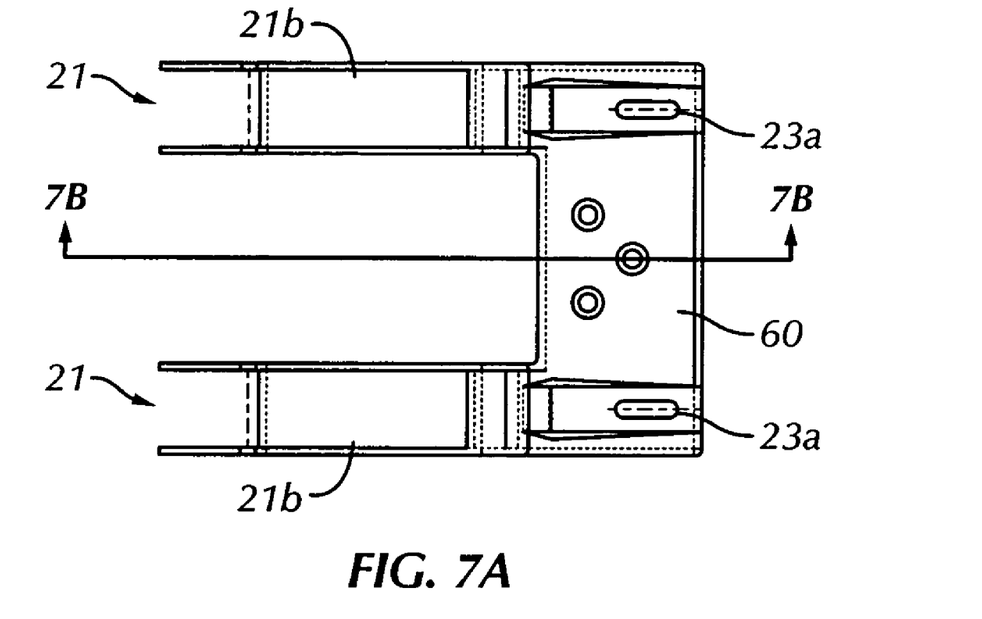
FIG. 7A is top plan view of a frame of the clamp of the blade restraint system of FIG. 2.
Figure 7B:
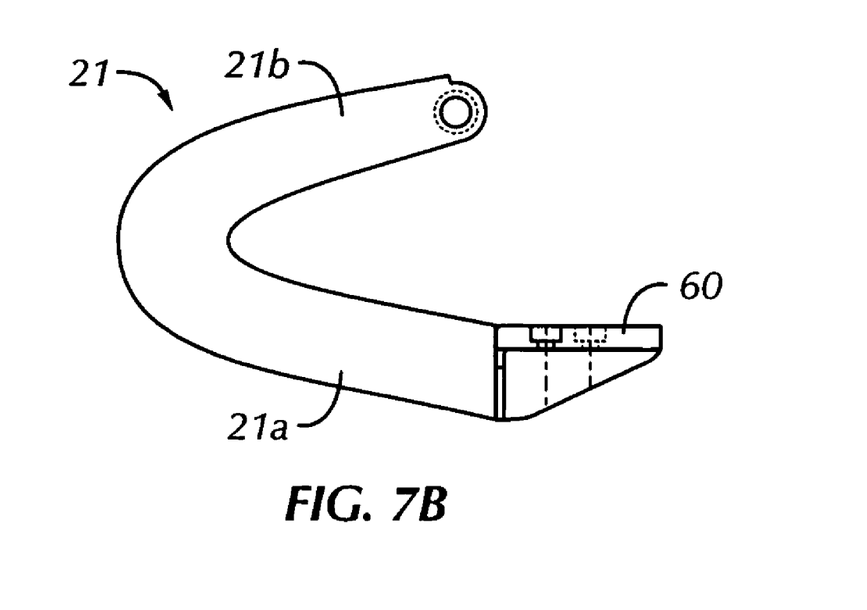
FIG. 7B is a cross sectional view of the frame shown in FIG. 7A, taken along line 7B—7B of FIG. 7A.

Referring to FIGS. 6A, 6B and 6D, the clamp 15' of the second preferred embodiment includes the pole lock mechanism 50 that cooperates with the cylindrical member 11a' and first ball fitting 19' to move the clamp 15' between the clamped and open positions. The pole lock mechanism 50 is mounted to the lower leg 21a' between upstanding legs of the lower leg 21a' by a lower spacer 51. The pole lock mechanism 50 also includes a finger 52 mounted to the first ball fitting 19', a handle 53 that is in an operative relationship with the finger 52, first and second toothed links 54, 55, a pair of actuators 56, 57 secured to the links 54, 55, a pivot arm 60 connected to an end of the actuators 56, 57 and an actuating panel 58 mounted to the pivot arm 60. The actuating panel 58 is mounted at an end opposite its attachment to the pivot arm 60 to the pivoting end 47 of the upper leg 21b'. Each of the components of the pole lock mechanism 50 is constructed of a composite material but is not so limited. The above-listed components of the pole lock mechanism 50 may be comprised of nearly any material that is able to take on the general shape of the pole lock mechanism 50 components and withstand the normal operating conditions of the pole lock mechanism 50.

Referring to FIGS. 6A and 6D, the handle 53 preferably actuates the links 54, 55 to move between a separated position (dashed in FIG. 6D) and an adjacent position (solid in FIG. 6D). In the separated position, the pivoting end 47 is in an open position such that the clamp pad 23' attached to the pivoting end 47 is at its furthest position away from the clamp pad 23' attached to the free end of the lower leg 21a'. In contrast, in the adjacent position, the clamp pad 23' attached to the pivoting end 47 is at its closest position to the clamp pad 23' attached to the terminal end of the lower leg 21a'. Specifically, when the handle 53 is contacted on either of its sides by the finger 52, the handle 53 moves the links 54, 55, which move the actuators 56, 57, which causes the actuating panel 58 to pivot about the pivot arm 60 and either pivot the pivoting end 47 toward or away from the terminal end of the lower arm 21a'.

To operate the second preferred embodiment of the blade restraint system 10', the fuselage support 36 is mounted to the fuselage 17. The clamp 15' is mounted to the first pole pair 11 and the clamp 15' and first pole pair 11' are moved such that the clamp 15' is prepared to engage the leading edge of the blade 16'. The clamp 15' is positioned such that the leading edge of the blade 16' is located within or near the roots of the lower and upper legs 21a', 21b' and the blade 16' is positioned between the clamp pads 23'. The first cylindrical member 11a' is then pivoted such that the finger 52 contacts a first side of the handle 53. When the finger 52 contacts the first side of the handle 53, the links 54, 55 move to the adjacent position and the actuating panel 58 urges the pivoting end 47 to pivot toward the lower leg 21a' and clamp the blade 16' between the clamp pads 23'. The first pole pair 11 is then operated as was described above to secure the blade 16' in the stowed condition.

To convert the blade 16' out of the stowed condition in the second preferred embodiment of the blade restraint system 10', the pole pair attached to the clamp 15' is removed from the fuselage support 36' and the fuselage support 36' is released from the fuselage 17' such that the first pole pair 11' and the clamp 15' is suspended from the blade 16'. The first cylindrical member 11a' is pivoted in an opposite direction such that the finger 52 contacts a second side of the handle 53. When the finger 52 contacts the handle 53, the links 54, 55 move to the separated position and the actuating panel 58 urges the pivoting end 47 to pivot away from the lower leg 21a' to release the clamping force on the blade 16' by the clamp pads 23'. The clamp 15' and first pole pair 11' are released from the blade 16' and lowered to the ground as was described above for the first preferred embodiment.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

I claim:

1. A blade restraint system for restraining a blade of a helicopter comprising:

a blade clamp releasably mountable to the blade; and a pole pair releasably mountable to the blade clamp at a clamp end, the pole pair releasably mountable to the helicopter fuselage at an aircraft end, the pole pair including a first pole and a second pole, the first and second poles movable relative to each other between a storage position and an extended position, the first pole positioned generally within the second pole in the storage position, the first and second poles being pivotally mounted to each other proximate the clamp end, the first pole being pivotable between the storage and extended positions.

2. A blade restraint system for restraining a blade of a helicopter comprising:

a blade clamp releasably mountable to the blade;

a pole pair releasably mountable to the blade clamp at a clamp end, the pole pair releasably mountable to the helicopter fuselage at an aircraft end, the pole pair including a first pole and a second pole, the first and second roles movable relative to each other between a storage position and an extended position, the first pole positioned generally within the second pole in the storage position;

a first ball fitting mounted to the pole pair proximate the clamp end;

a first ball joint mounted to the blade clamp, the pole pair being releasably mountable to the blade clamp through engagement of the first ball fitting with the first ball joint; and a spring-damper device mounted between the first ball fitting and the second pole proximate the clamp end.

3. A blade restraint system for restraining a blade of a helicopter comprising:

a blade clamp releasably mountable to the blade; and a pole pair releasably mountable to the blade clamp at a clamp end, the pole pair releasably mountable to the helicopter fuselage at an aircraft end, the pole pair including a first pole and a second pole, the first and second poles movable relative to each other between a storage position and an extended position, the first pole positioned generally within the second pole in the storage position, wherein the first pole has a generally circular cross-section and the second pole has a generally U-shaped cross-section.

4. A blade restraint system for restraining a blade of a helicopter comprising:

a blade clamp releasably mountable to the blade;

a pole pair releasably mountable to the blade clamp at a clamp end, the pole pair releasably mountable to the helicopter fuselage at an aircraft end, the pole pair including a first pole and a second pole, the first and second poles pivotally mounted to and movable relative to each other between a storage position and an extended position, the first pole positioned generally within the second pole in the storage position, wherein the blade clamp and the pole pair are constructed of a composite material.

5. The blade restraint system of claim 4 further comprising:

a fuselage support removably mountable to the helicopter fuselage, the fuselage support including a root end removably engageable with the helicopter fuselage to secure the fuselage support to the helicopter fuselage, the fuselage support including a third ball fitting and a second ball fitting spaced from the root end, the third ball fitting being releasably engageable with the aircraft end of the first pole and the second ball fitting being releasably engageable with the aircraft end of the second pole to secure the aircraft end to the helicopter fuselage.

6. The blade restraint system of claim 4 further comprising:

a bumper mounted to the blade restraint system, the bumper constructed of a polymeric material, the bumper providing an elastic surface on portions of the blade restraint system that limits damage when the elastic surface comes into contact with one of the helicopter and blade.

7. A blade restraint system for restraining a blade of an aircraft comprising:

a one-piece composite frame that is corrosion resistant;

clamp rubbers that are secured to at least one portion of the composite frame to protect the blade and the blade restraint system;

a vibration dampener mounted to the blade restraint system to protect the aircraft, blade and blade restraint system from damage during loading;

two poles removably mountable to the composite frame and mounted to each other, one of the poles being foldable into the other pole in a storage position;

a fuselage support being bi-directionally installable to the aircraft fuselage, the two poles being removably mountable to the fuselage support;

bumpers mounted to the blade restraint system to provide drop protection;

polymer springs mounted to the blade restraint system that are corrosion resistant; and locks associated with the blade restraint system, the locks being integral with the blade restraint system, wherein the blade restraint system is constructed of marine grade materials.

8. The blade restraint system of claim 7 further comprising:

a clamp lock mounted to the composite frame that is activated by rotation of the two poles.

9. The blade restraint system of claim 7 wherein the fuselage support may be disassembled using a single screw.

* * * * *